United States Patent
Kumar et al.

(10) Patent No.: US 10,241,776 B2
(45) Date of Patent: Mar. 26, 2019

(54) USER SETTINGS ACROSS PROGRAMS

(71) Applicant: Microsoft Technology Licensing, LLC., Redmond, WA (US)

(72) Inventors: Abhishek Kumar, Redmond, WA (US); Gargee Sharma, Redmond, WA (US); Subash Kumar Bhamidipati, Issaquah, WA (US); Ananthakrishnan Ramanathan, Redmond, WA (US); Matthew Carlo Razza, Bellevue, WA (US); Vidya Kotteri, Bothell, WA (US); Ying Zhe Chong, Redmond, WA (US); Cancan Shi, Bellevue, WA (US); Bhanu Samyal, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/231,740

(22) Filed: Aug. 8, 2016

(65) Prior Publication Data
US 2017/0293479 A1   Oct. 12, 2017

Related U.S. Application Data

(60) Provisional application No. 62/320,167, filed on Apr. 8, 2016.

(51) Int. Cl.
*H04N 7/173* (2011.01)
*G06F 9/445* (2018.01)
(Continued)

(52) U.S. Cl.
CPC .............. *G06F 8/65* (2013.01); *G06F 9/44505* (2013.01); *G06F 9/451* (2018.02);
(Continued)

(58) Field of Classification Search
CPC ....... H04L 67/306; H04L 67/34; H04L 67/02; H04L 67/2842; H04L 67/42; H04L 63/08;
(Continued)

(56) References Cited

U.S. PATENT DOCUMENTS 7,784,031 B1 * 8/2010 Borg ................... G06F 9/44505
                                                        713/1
8,074,288 B2  12/2011 Sambotin et al.
(Continued)

FOREIGN PATENT DOCUMENTS

GB          2510199 A        7/2014

OTHER PUBLICATIONS

Datto Company, Advanced Security Configuration and Compliance in G Suite, Part Four, 15 pages (Year: 2014).*
(Continued)

*Primary Examiner* — Thuy Dao
(74) *Attorney, Agent, or Firm* — Merchant & Gould P.C.

(57) ABSTRACT

Changing user settings across applications and/or across devices via a dialog within one application is provided herein. The systems and methods discussed herein provide for an improved user experience and fewer computing resources to be expended when changing user settings by aggregating the changeable settings, allowing for their modification via a single dialog, and distributing settings changes to remote hosts, which in turn provide consistent settings across devices. The settings available to the user may be governed in association with the user's licenses to access programs and may be affected by domain level controls by an administrator.

20 Claims, 12 Drawing Sheets

(51) Int. Cl.
G06F 15/16 (2006.01)
G06F 8/65 (2018.01)
H04L 29/08 (2006.01)
H04L 29/06 (2006.01)
G06F 9/451 (2018.01)

(52) U.S. Cl.
CPC .......... H04L 67/2842 (2013.01); H04L 67/34 (2013.01); H04L 67/42 (2013.01)

(58) Field of Classification Search
CPC .. H04L 63/083; H04L 63/0815; H04W 12/08; H04W 4/001; G06Q 30/0207; G06Q 30/02; G06F 8/61; G06F 9/44505; G06F 9/451; G06F 8/65; G06F 17/30873; G06F 2216/15; G06F 17/30864; G06F 17/30477; G06F 21/6227; G06F 3/04842; H04H 20/38; H04H 20/426
See application file for complete search history.

(56) References Cited

U.S. PATENT DOCUMENTS

| | | | |
|---|---|---|---|
| 8,244,923 | B2 | 8/2012 | Hamaguchi |
| 8,504,001 | B2 | 8/2013 | Van Os et al. |
| 8,914,840 | B2* | 12/2014 | Reisman ........... G06F 17/30873 725/110 |
| 9,077,733 | B2 | 7/2015 | Kazan et al. |
| 9,122,557 | B1 | 9/2015 | Swerdlow et al. |
| 9,197,694 | B2* | 11/2015 | Palmeri ............. G06F 17/30566 |
| 9,600,257 | B2* | 3/2017 | Somani ..................... G06F 8/61 |
| 9,621,424 | B2* | 4/2017 | Luty .................. H04L 41/0853 |
| 9,817,680 | B1* | 11/2017 | Floyd .................. G06F 9/44505 |
| 10,084,769 | B2* | 9/2018 | Mathew ................ H04L 67/141 |
| 2005/0091346 | A1 | 4/2005 | Krishnaswami et al. |
| 2007/0271505 | A1* | 11/2007 | Dandekar ......... G06F 17/30861 715/234 |
| 2007/0283011 | A1 | 12/2007 | Rakowski et al. |
| 2007/0288591 | A1 | 12/2007 | Wong et al. |
| 2008/0026729 | A1 | 1/2008 | May et al. |
| 2011/0231482 | A1* | 9/2011 | Benna ............... G06F 17/30867 709/203 |
| 2011/0283215 | A1 | 11/2011 | Dunn et al. |
| 2012/0150796 | A1* | 6/2012 | Martick .............. G06F 17/3048 707/610 |
| 2012/0174212 | A1 | 7/2012 | Dart et al. |
| 2012/0198439 | A1* | 8/2012 | Kane ......................... G06F 8/61 717/177 |
| 2013/0346954 | A1* | 12/2013 | Tryon ................... G06F 9/4451 717/168 |
| 2014/0280913 | A1* | 9/2014 | Karren .................. H04W 4/001 709/224 |
| 2014/0282062 | A1* | 9/2014 | Kapoor ............... G06F 9/44505 713/1 |
| 2015/0089224 | A1* | 3/2015 | Beckman .............. H04L 63/105 713/168 |
| 2015/0262077 | A1* | 9/2015 | White .................. G06N 99/005 706/12 |
| 2015/0319039 | A1* | 11/2015 | Generozova ........ G06F 9/44505 709/220 |
| 2015/0370581 | A1 | 12/2015 | Bailey et al. |

OTHER PUBLICATIONS

Hudak et al., OSC OnDemand: a web platform integrating access to HPC systems, web and VNC applications, 6 pages (Year: 2013).*
Hoffman, Chris, "13 Things You Can Do With the Google Settings App on Any Android Device", Published on: Aug. 28, 2015 Available at: http://www.howtogeek.com/226844/13-things-you-can-do-with-the-google-settings-app-on-any-android-device/.
Dayaratna, Arnal, "Cloud Computing Today", Published on: Jun. 25, 2014 Available at: https://cloud-computing-today.com/tag/steve-jobs/.
"Configuration Packages: Explained", Retrieved on: Apr. 12, 2016 Available at: http://docs.oracle.com/cd/E29505_01/fusionapps.1111/e20365/F395867AN11FF9.htm.
"International Search Report and Written Opinion Issued in PCT Application No. PCT/US2017/025228", dated Jul. 7, 2017, 12 Pages.

* cited by examiner

USER SETTINGS ACROSS PROGRAMS

CROSS-REFERENCES TO RELATED APPLICATIONS

The present application claims benefit from U.S. Provisional Application No.: 62/320,167 filed on Apr. 8, 2016 and having the title "USER SETTINGS ACROSS PROGRAMS," which is herein incorporated by reference in its entirety.

BACKGROUND

Computer programs often include various settings that users may change to customize the behavior of a given program. For example, a user may change the default margins in a word processing application so that a newly created document will fit a given size of paper (e.g., A4, A3, 8½×11, legal). To change these settings across multiple computer programs or on multiple devices, however, users must change the settings application by application and device by device, which is labor intensive for the user, and requires additional processing resources to be expended each time a settings dialog is presented to the user which is limited to a given program.

SUMMARY

This summary is provided to introduce a selection of concepts in a simplified form that are further described below in the Detailed Description section. This summary is not intended to identify all features of the claimed subject matter, nor is it intended as limiting the scope of the claimed subject matter.

Systems and methods are provided herein for enabling a more efficient modification of user settings across programs or across devices. A dialog is provided within a first application that provides the user the ability to view multiple applications in which a setting may be modified. Within the dialog, user settings for programs available to the user are aggregated for the user to browse and modify. The settings are stored to a remote storage medium, such as on the "cloud," and are distributed to connected devices to enable the propagation of settings across programs with reduced use of processing and memory resources.

The details of one or more aspects are set forth in the accompanying drawings and description below. Other features and advantages will be apparent from a reading of the following detailed description and a review of the associated drawings. It is to be understood that the following detailed description is explanatory only and is not restrictive; the proper scope of the present disclosure is set by the claims.

BRIEF DESCRIPTION OF THE DRAWINGS

The accompanying drawings, which are incorporated in and constitute a part of this disclosure, illustrate various aspects of the present disclosure. In the drawings.

DETAILED DESCRIPTION

Figure 1:
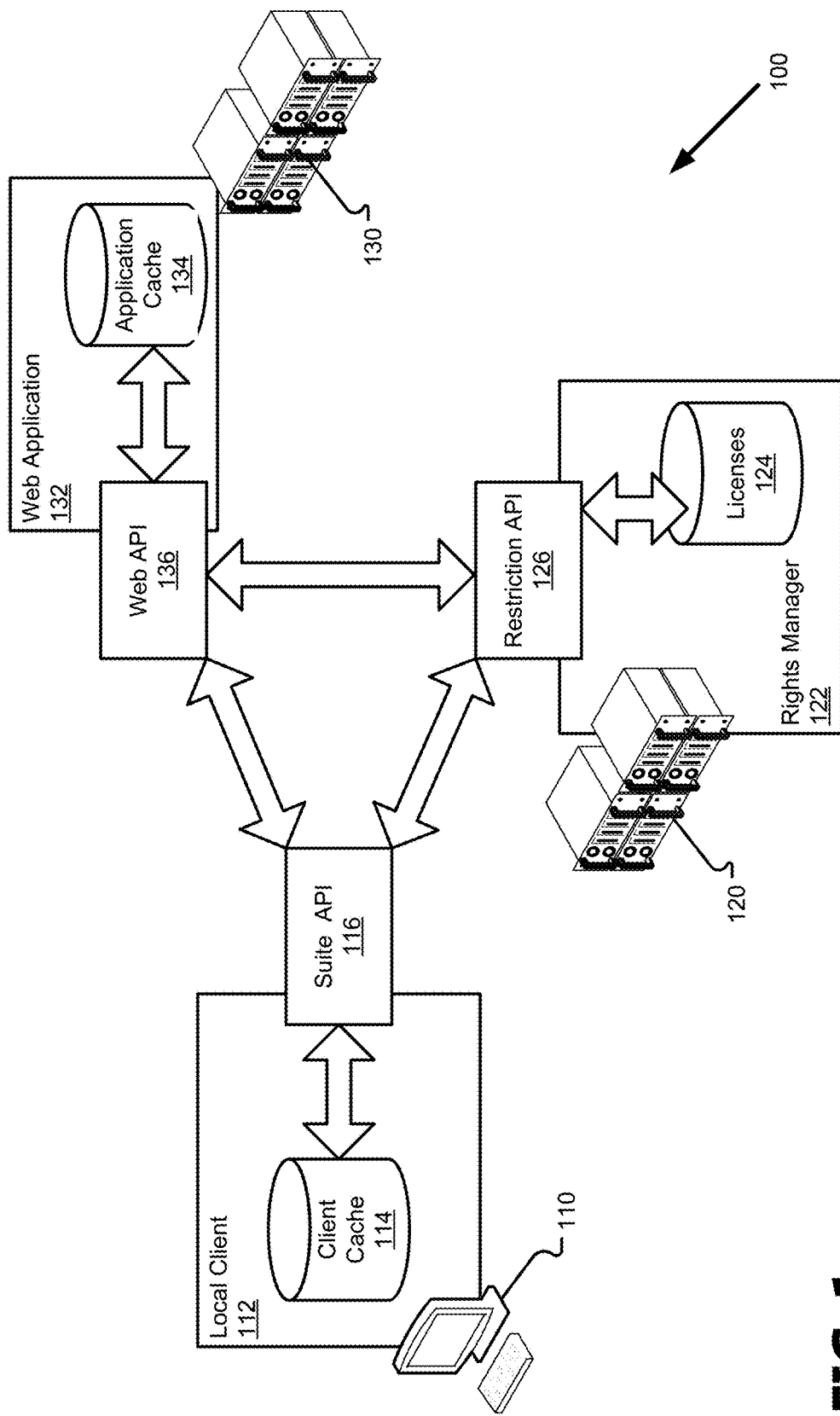
FIG. 1 illustrates an example environment in which the modification of user settings across platforms may be practiced.

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. Examples may take the form of a hardware implementation, or an entirely software implementation, or an implementation combining software and hardware aspects. The following detailed description is, therefore, not to be taken in a limiting sense.

Systems and methods are provided herein for enabling a more efficient modification of user settings across programs or across devices. A dialog is provided within a first application that provides the user the ability to view multiple applications in which a setting may be modified. Within the dialog, user settings for programs available to the user are aggregated for the user to browse and modify. The settings are stored to a remote storage medium, such as the cloud, and distributed to connected devices to enable the propagation of settings across programs and devices with reduced use of processing and memory resources.

FIG. 1 illustrates an example environment 100 in which the modification of user settings across platforms may be practiced. The example environment 100 includes a client machine 110, a rights server 120, and an application host 130, which are all examples of computing devices. The client machine 110 provides a user interface (UI) by which a user may interact with programs and change the settings for one or more programs across devices. The application host 130 provides web applications 132 to the client machine 110, which may be accessed via a local client 112 running on the client machine 110 to provide the program functionality to the user. The rights server 120 determines which local clients 112 may affect which settings of which web applications 132, and which web applications 132 may affect which settings of which local clients 112. As will be appreciated, although only one of each machine and its components are illustrated in FIG. 1, environments that include multiple of one or more of the illustrated machines, which may each run multiple components are contemplated by and included in the present disclosure.

The client machine 110, the rights server 120, and the application host 130 are illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers. The hardware of these computing systems is discussed in greater detail in regard to FIGS. 4, 5A, 5B, and 6.

In various aspects, the client machine 110 is accessed locally and/or by a network, which may include the Internet, a Local Area Network (LAN), a private distributed network for an entity (e.g., a company, a university, a government agency), a wireless ad hoc network, a Virtual Private Network (VPN) or other direct data link (e.g., Bluetooth connection, a directly wired link). Data are transferred between the client machine 110, the rights server 120, and the application host 130 for sharing settings, notifications, and other communications. As will be understood, the network may be exclusively used for the distribution of settings or may be accessed by the computing devices for communication with devices that are not part of the distribution group.

The client machine 110 accepts inputs from the user, who may access a web application 132 provided over a network via a local client 112. The local client 112 may be a thin client, such as a web browser, which sends information to the application host 130 for the provision of the web application 132 as a web-based program. Examples of web-based programs include Google Docs™ or Google Sheets™ (available from Alphabet, Inc. of Mountain View, Calif.) or the Office 365™ online productivity suite (available from Microsoft, Corp. of Redmond, Wash.). The local client 112 may also be a local program that is in communication with a web-based equivalent or an online storage solution linked with the program. For example, the Pages® or Word™ word-processing programs (available from Apple, Inc. of Cupertino, Calif. and Microsoft, Corp., respectively) are examples of local programs that may be in communication with web-based versions of those programs or storage solutions, such as, for example, Google Drive™ or OneDrive® (available from Alphabet, Inc. and Microsoft, Corp., respectively).

Via the local client 112, a user may be presented with a user interface (UI) element or a dialog to change settings for the program and other programs to which the user has access rights. These settings are stored locally in the client cache 114 and remotely in the application cache 134. The settings are shared between the local client 112 and the web application 132 via Application Program Interfaces (API) such as the suite API 116 on the local client 112 and the web API 136 on the application host 130. The suite API 116 enables the user to change exposed settings (i.e., those settings which the user is enabled to adjust) locally in the client cache 114 and remotely in the application cache 134 for the program that the user is accessing and for multiple programs while those programs are in an inactive state (i.e., are not in active memory or being "run" on the local client 112). For example, a user may access a settings dialog in a word processing application and change settings for the word processing application, as well as a spreadsheet application, an email application, a presentation application, etc., from the same settings dialog without leaving the word processing application or entering the other applications. The web API 136 commits settings changes, made on the local client 112 and transmitted via the suite API 116, to the application caches 134 of affected web applications 132, but also transmits those changes to local clients 112 to ensure that the settings remain synchronized across platforms. For example, a user on a first client machine 110 (e.g., a smartphone) may change settings which the web API 136 will commit to a second client machine 110 that is associated with the same user (e.g., a personal computer) so that the user's settings will be consistently applied across devices. As will be appreciated, in various aspects, a user may opt a given client machine 110 or local client 112 out of receiving updates to settings (or the client machine 110 or local client 112 may lack network connectivity), in which case the settings stored in the client cache 114 will be used for the associated local client 112.

Settings are exposed on a per application basis and may have additional restrictions placed thereon by administrators in a computing domain or the developers of the applications. For example, the application host 130 may provide a first web application 132, a second web application 132, and a third web application 132, for which a user wishes to change a "default page size" setting, but an administrative user may restrict the user from changing the "default page size" setting in the first web application 132 and the developers of the second web application 132 may have hidden (i.e., prevented the exposure of) the "default page size" setting on the web-based version of the application, leaving the user the ability to change the setting only for the third web application 132 despite all three example applications including this property. In another example, a user may be restricted from changing language options (and other settings used outside of the application), author identifiers (and other personal information used within the application), or favorites (and other settings that rely on local content).

The rights server 120 hosts the rights manager 122, which is an application that determines which web applications 132 the user is authorized to access, enables the suite API 116 to present only those applications to the user for which settings may be modified, and regulates which client machines 110 the web API 136 accepts settings changes from or transmits settings changes to. In various aspects, the rights server 120 may run on the same computing device as the client machine 110 or the application host 130. The rights manager 122 communicates with the local client 112 and web applications 132 via the restriction API 126, and determines which licenses 124 the user has for various web applications 132 and whether those licenses are available for the particular client machine 110 that the user is currently using. In various aspects, the licenses 124 stored by the rights server 120 may be machine licenses (tied to a given computing device or set of computing devices), site licenses (tied to a given computing domain for a given number of "seats"), user licenses (tied to a given user), or combinations thereof. Licenses 124 may set various permissions for various users (e.g., a guest user, a tenant user, an administrative user) and may vary across applications.

The local client 112, when in communication with the rights server 120 and the application host 130, is operable to provide to the user a single dialog in a given application by which the user may browse user settings and make modifications thereto for applications (including and in addition to the application providing the dialog) to which the user has access. Applications for which the user does not have access (i.e., lacks a license 124) or for which user settings are not available, are not presented in the dialog or are presented as "grayed out" and/or stating how that setting may be modified (e.g., locally modifiable only, administrator rights required). Additionally, the user may filter and rearrange the presentation of settings in the dialog to affect their presentation in the UI to navigate and browse the settings. The user may make modifications to the settings via the dialog, which will be transmitted to the various web applications 132 and/or received by other client machines 110 associated with the user that are in communication with the rights server 120 and application host 130, thereby enabling the propagation of settings across programs and devices with reduced use of processing and memory resources compared to systems that require multiple dialogs that are specific to programs or devices.

FIGS. 2A-F illustrate various example dialogs 200 in which settings across programs and devices may be aggregated and by which a user may browse and modify those settings. As one of ordinary skill in the art will recognize, the dialogs 200 include several user interface elements which will be identifiable from the illustrations, and alternate arrangements of data, different controls, and different data are possible in other dialogs, and thus, the illustrated dialogs 200 are non-limiting examples.

Figure 2A:
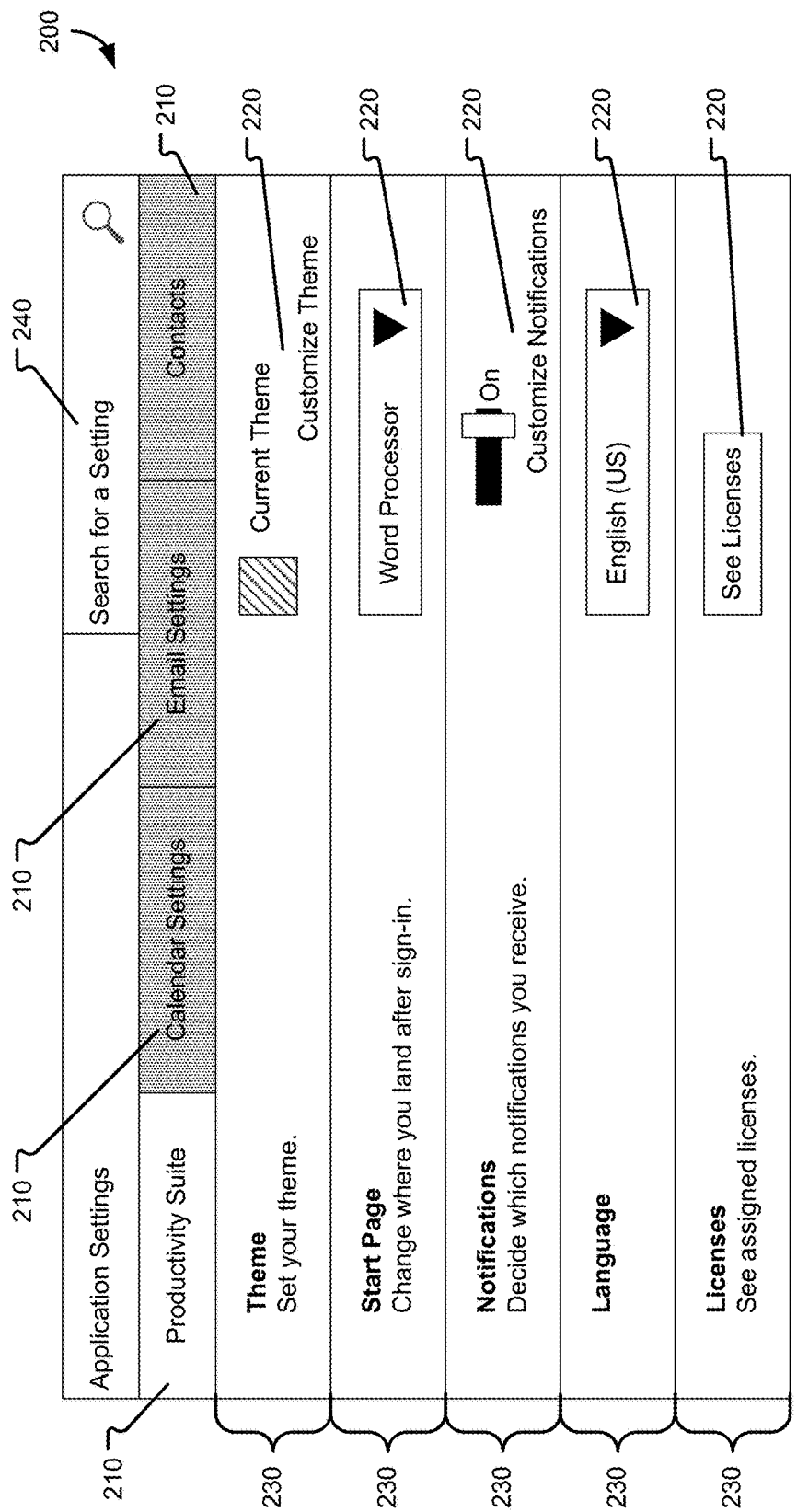
FIGS. 2A-F illustrate various example dialogs in which settings across programs and devices may be aggregated and by which a user may browse and modify those settings.

As illustrated in FIG. 2A, a dialog 200 is shown for a user to manipulate settings organized into groups. Each group of settings is associated with a tab 210 in the illustrated dialog 200, and a tab 210 for a "productivity suite" group of setting is shown as highlighted and active. The settings and controls 220 to modify the settings are shown for the active group. As will be appreciated, the controls 220 may take many forms in various aspects, such as, for example: list boxes, drop-down-lists, a date picker, combo boxes, text boxes, slider bars, radio buttons, check boxes, rotary selectors, spinners, buttons, etc. Each settings group displayed may include a preview 230 and one or more controls 220. The dialog 200 also includes a search bar 240 for a user to set search criteria by which to find programs or settings matching or related to the search criteria to view or modify.

Figure 2B:
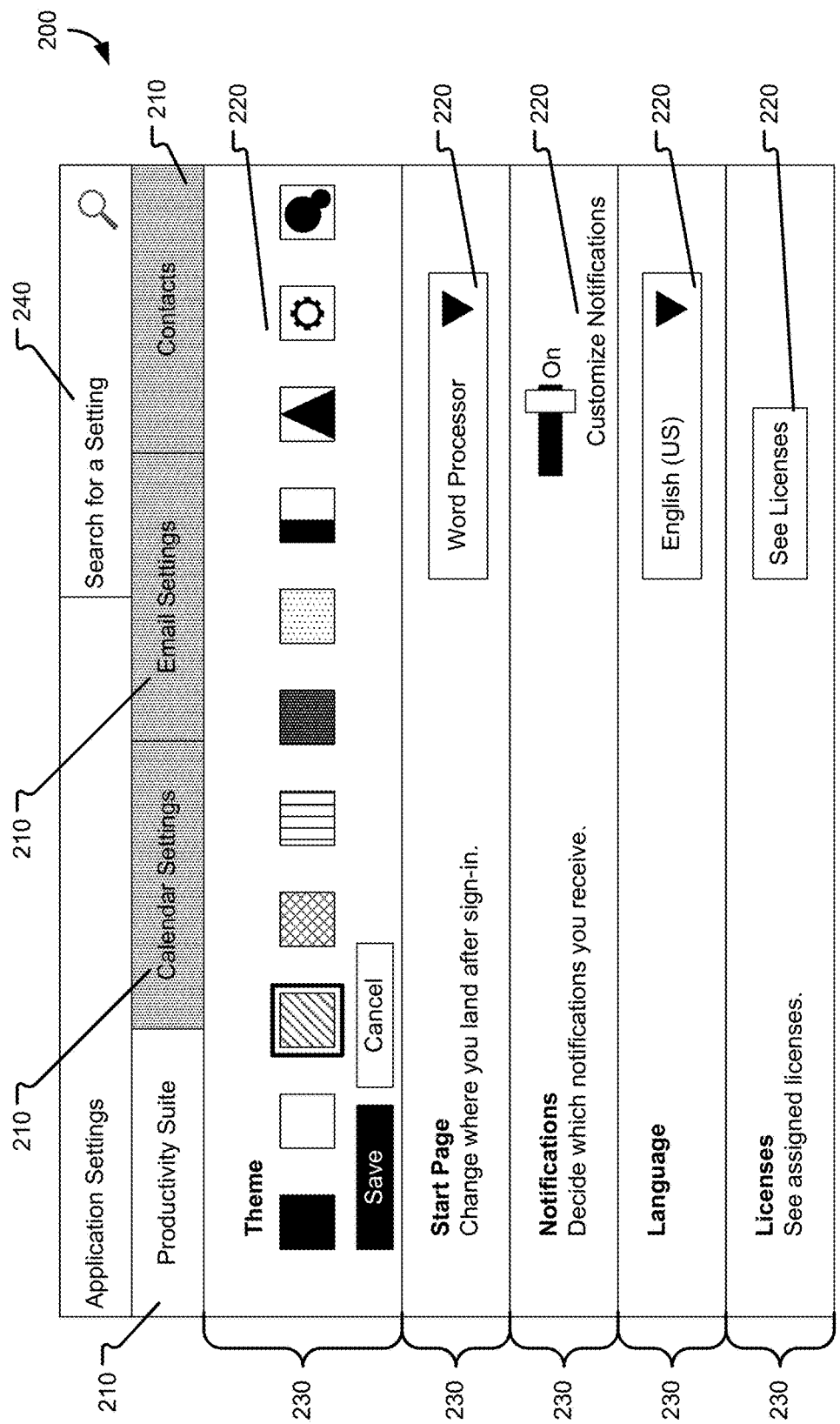

In various aspects the controls 220 may cause the displayed setting to expand from an initial display into a detailed display, such as is shown in FIG. 2B relative to FIG. 2A. In the dialog 200 of FIG. 2B, in response to a user selecting the "customize theme" control 220, the preview 230 for the "theme" group of settings is expanded to allow the user greater control and more space in the graphical user interface to display options related to the group that is of interest to the user. Although not illustrated, one of ordinary skill in the art will appreciate that sub-tabs, pop-up windows, and scroll bars may be provided to allow for more information to be included that can be shown in a given display area and the amount of expansion of a preview 230 may vary in different aspects.

Figure 2C:
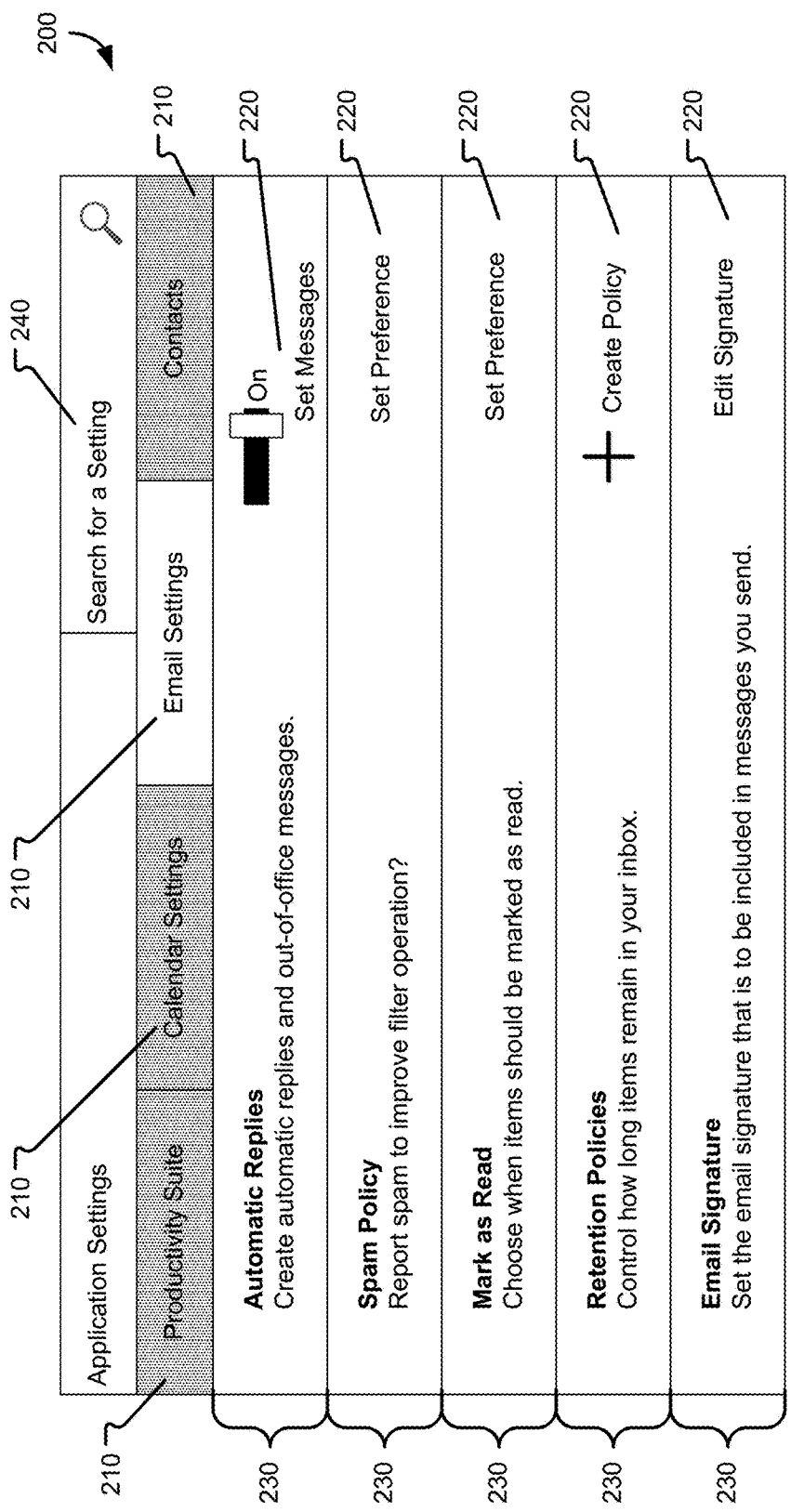
Figure 2D:
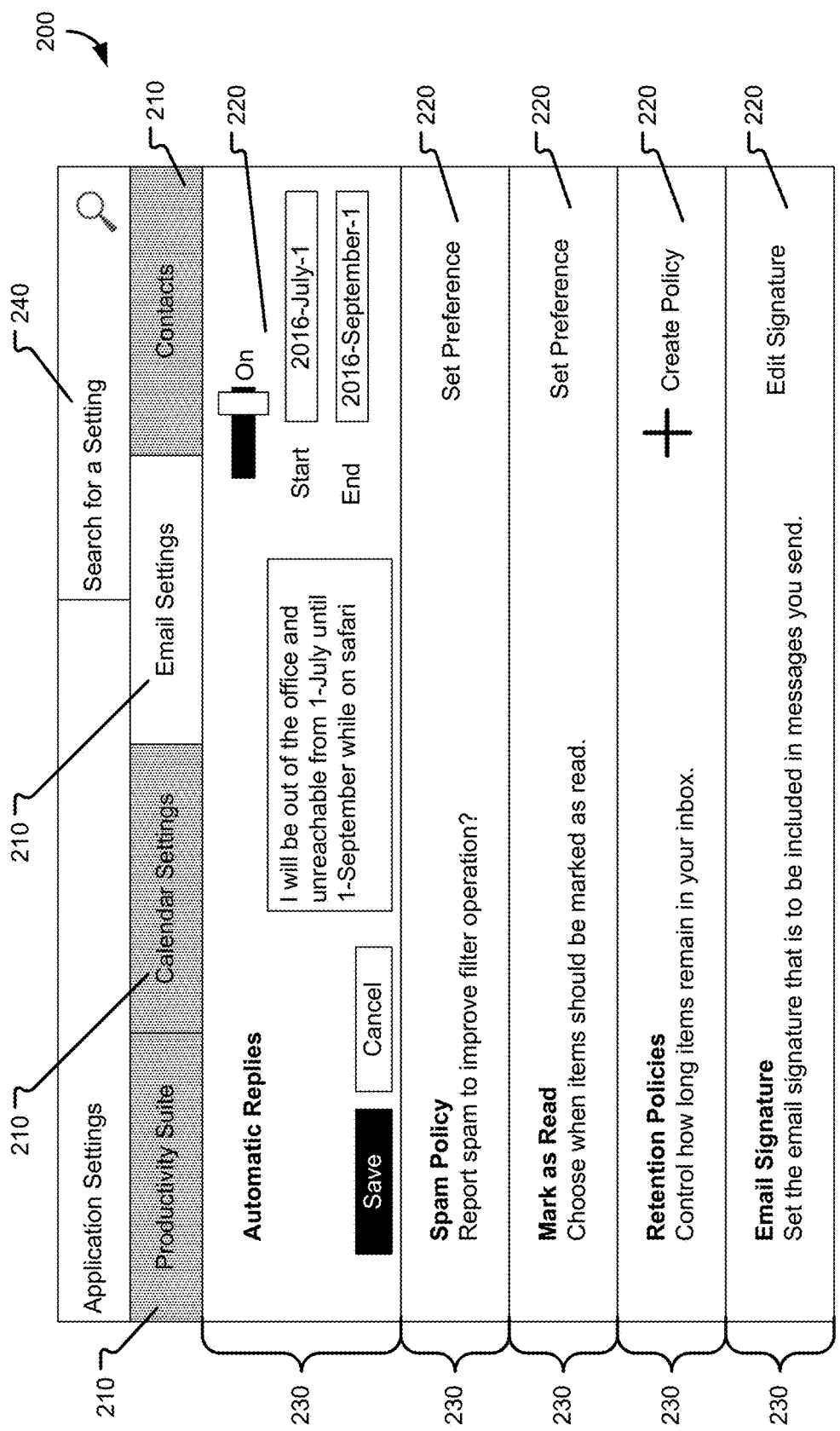

FIG. 2C illustrates a dialog 200 when a different tab 210 has been selected than is illustrated in FIG. 2A (the "email settings" tab 210 instead of the "productivity suite" tab 210). Similarly, FIG. 2D shows an expanded view of the "automatic replies" group from FIG. 2C. The settings modified from a selected tab 210 will affect the program or programs that are grouped into the dialog 200. For example, when the "email settings" tab 210 is selected, settings related to an email application will be displayed for the user to view and potentially modify. A tab 210 may encompass settings for multiple applications (e.g., a productivity suite tab 210 may affect a word processor, a spreadsheet application, a presentation application, etc.) and one application may have its settings broken across multiple tabs 210 (e.g., an email application may have settings broken into a "calendar settings" tab 210, an "email settings" tab 210, and a "contacts" tab 210). The exact number of tabs 210 and the settings grouped under each tab 210 may be set by a developer and may vary in different aspects.

Figure 2E:
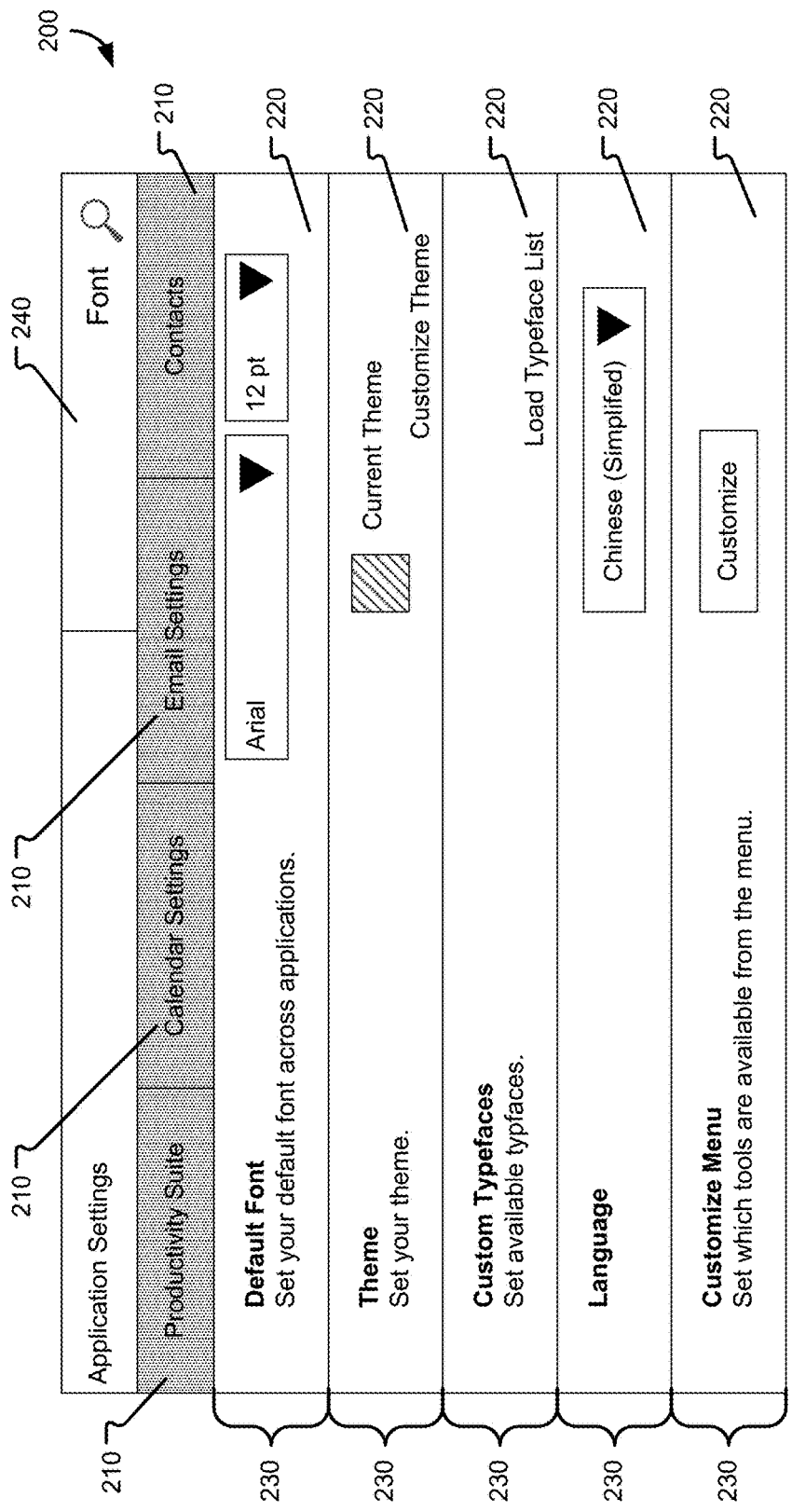

The search bar 240 allows a user to input search criteria to locate settings either within a specific tab 210 or independently of a tab 210. FIG. 2E illustrates a dialog 200 showing an example search criteria for "font" input into the search bar 240 returning various settings related to fonts across several applications. For example, a settings group for a "default font," "theme," "custom typefaces," "language," and "customize menu" may all implicate font selection/manipulation/presentation in some way in one or more applications and will be returned in response to the search criteria. The search criteria are checked against the search metadata to determine which user settings are related to the search criteria. The previews 230 for the settings may be organized in the dialog 200 according to a relevance of the settings group to the search criteria, a number of applications (licensed or regardless of license status) referenced by the settings group, a frequency of modification of the settings within the settings group, alphabetically, or combinations thereof.

Figure 2F:
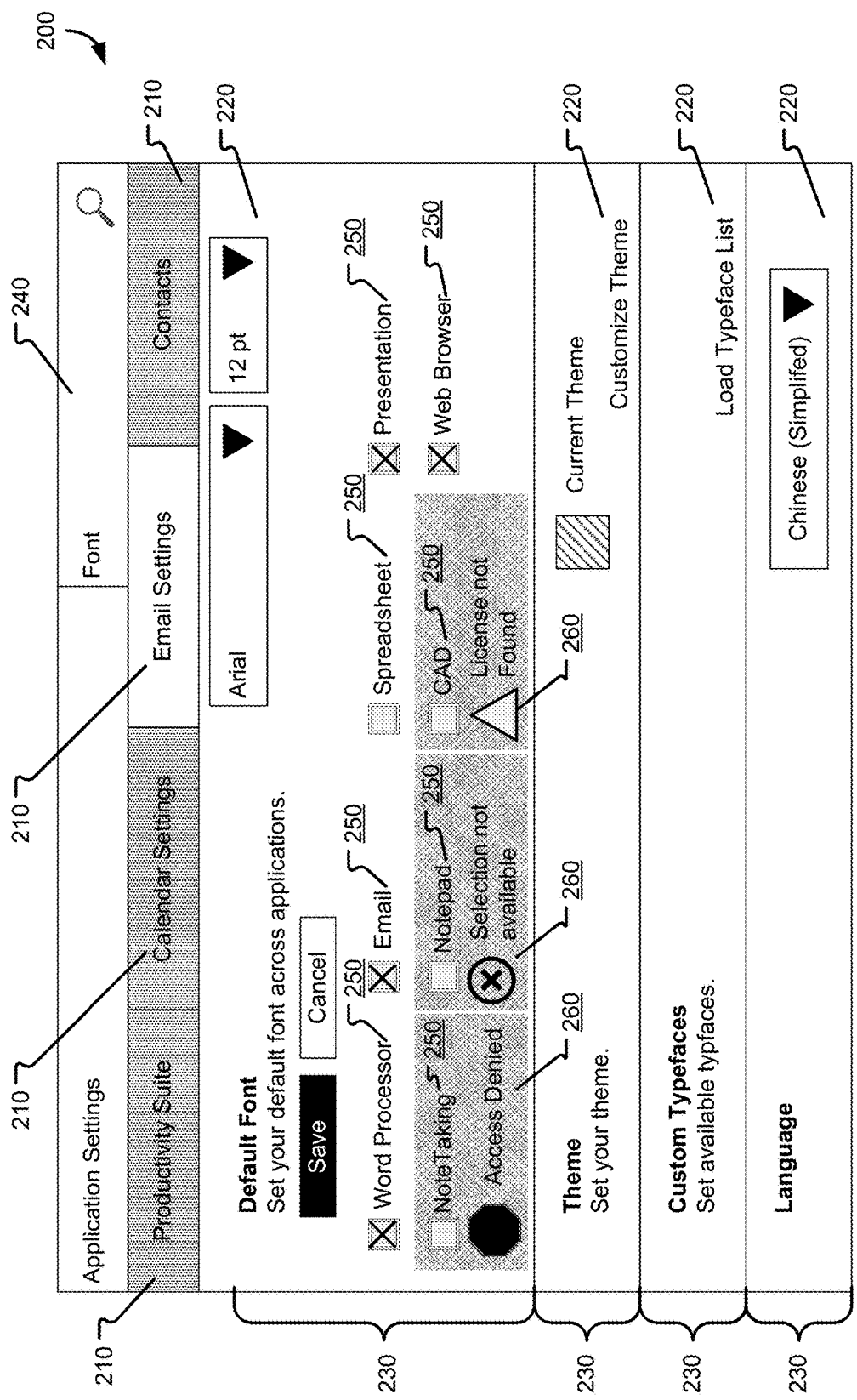

FIG. 2F illustrates a dialog 200 showing an expansion of the "default font" preview 230 of FIG. 2E. In the illustrated preview 230, the applications affected by the setting whose preview 230 was selected are shown with selectors 250 associated with each application so that the user may actuate or un-actuate a selector 250 and have the given setting applied or not applied to the associated application. In various aspects, when a given application does not have its selector 250 actuated when a setting is applied, the application may retain the current state of the selected setting, the user may be prompted to set a different state for that setting in the application, or the application may be set into a sub-grouping that the user may affect separately. For example, if a user were to want two different default typefaces for different sub-groups of programs (e.g., Garamond for a word processor and presentation application, and Arial for a spreadsheet application and a Computer Aided Drafting (CAD) program), each sub-group may be displayed in conjunction with different previews 230 or different controls 220 within the same preview 230 to distinguish each sub-group and allow the user to move a given program from one sub-group to another.

As will be appreciated, not every program that the dialog 200 is in communication with will be able to accept all the chosen settings or have a license for the user to access that program. For example, and as is illustrated in FIG. 2F, a NoteTaking application may refuse permission to modify the given setting via the dialog 200, a notepad program may not be able to apply an Arial typeface at size 12, and a user may not have a valid license to access a CAD application. Therefore, alerts 260 are illustrated in the dialog 200 that indicate that a given application cannot or does not accept a given setting from the dialog 200. Alerts 260 may be shown with icons, text explanations, highlighting (e.g., graying out the associated selector 250 or name) and combinations thereof.

Figure 3:
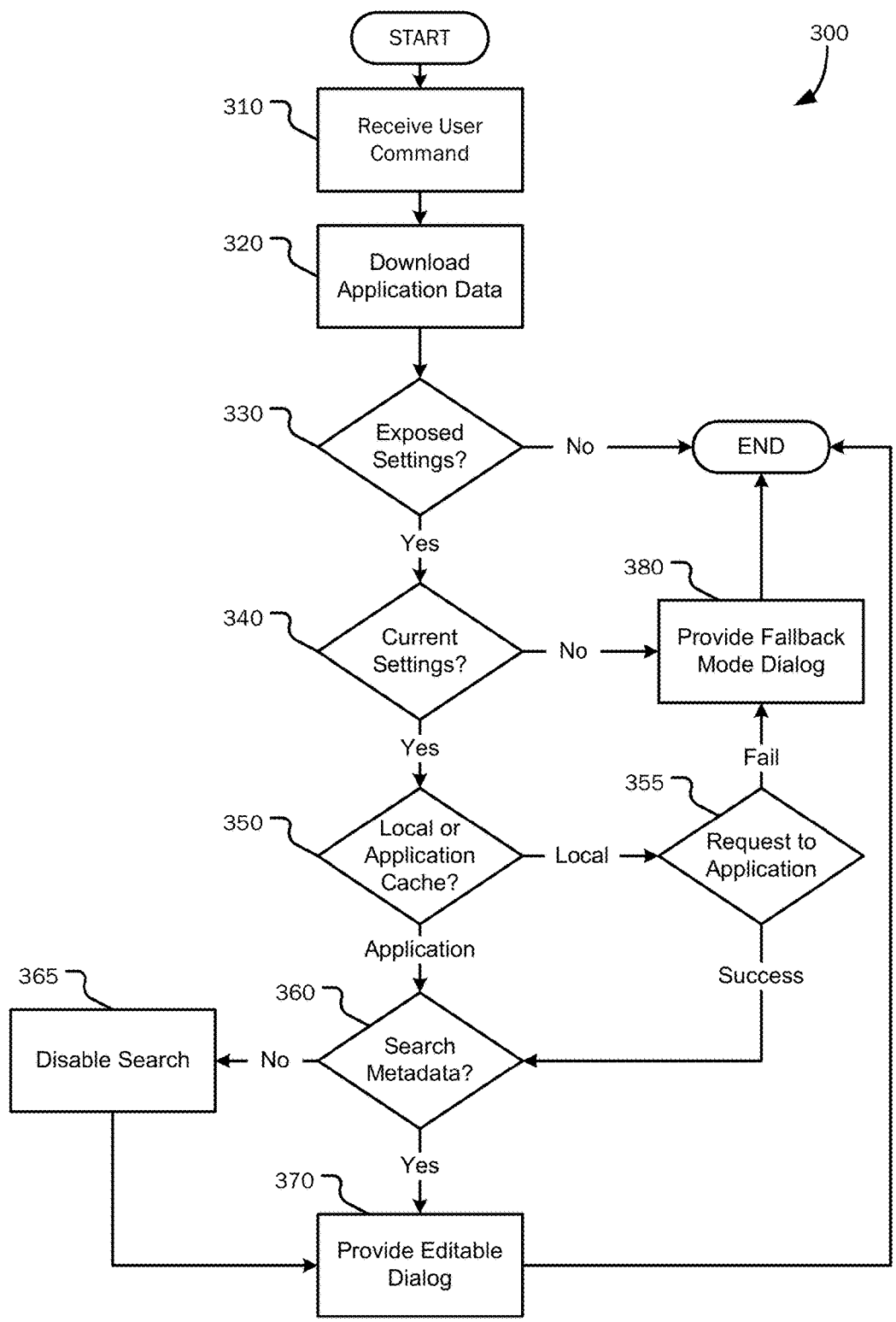
FIG. 3 is a flowchart showing general stages involved in an example method for providing a user with a dialog by which settings across programs and devices may be aggregated and a user may browse and modify those settings.

FIG. 3 is a flowchart showing general stages involved in an example method 300 for providing a user with a dialog by which settings across programs and devices may be aggregated and with which a user may browse and modify those settings. Method 300 begins at OPERATION 310 when a user command to change settings is received. In various aspects, such a command may be received when a user clicks on a UI element (such as an icon of a gear) or a menu item for settings, options, themes, master document, template, or the like. Method 300 then proceeds to OPERATION 320, where the application data needed to provide the dialog are downloaded. These data include listings of the exposed settings that a user can change, what the current settings are for the user, and metadata needed to search and browse the settings. Depending on which data are retrieved, and the sources from which they are retrieved, the provision of the dialog will change to match the available data.

At DECISION 330, it is determined whether any data relating to exposed settings have been retrieved. If no data are retrieved, or data indicating that no settings are exposed for the user are retrieved, method 300 may conclude or continue trying to download data for exposed settings. As will be appreciated, a timeout length of time or a number of attempts to try to find exposed settings may be set in the local client 112 so that method 300 will conclude once that value is reached. If data are retrieved that indicate settings are exposed for the user to modify, method 300 proceeds to DECISION 340.

At DECISION 340, it is determined whether the user's current settings have been retrieved. If the user's current settings have not been retrieved, method 300 proceeds to OPERATION 380. If the user's current settings have been retrieved, method 300 proceeds to DECISION 350, where it is determined whether the user's current settings were retrieved from a client cache 114 or an application cache 134 for the relevant application. If it is determined that the settings were retrieved from a client cache 114, a request is made at OPERATION 355 to the application cache 134 for the user's current settings. If the request made at OPERATION 355 fails, method 300 proceeds to OPERATION 380. As will be appreciated, a timeout length of time or a number of attempts to try to retrieve the user's settings from the application cache 134 may be set in the local client 112 so that method 300 will proceed to OPERATION 380 once that value is reached. If the user's current settings have been retrieved from the application cache 134, either at DECISION 350 or at OPERATION 355, method 300 proceeds to DECISION 360.

At DECISION 360 it is determined whether the search metadata were retrieved. If no search metadata were retrieved, method 300 proceeds to OPERATION 365, where search functionality is disabled in the dialog. Once the search functionality has been disabled or it is determined in DECISION 360 that the search metadata were retrieved, method 300 proceeds to OPERATION 370.

In method 300, OPERATION 370 provides an editable dialog by which a user may edit the settings for multiple applications across one or more devices, whereas OPERATION 380 provides a fallback mode for the dialog. The dialog in OPERATION 370 presents the user's settings as they are known across devices to the application hosts 130 and may be searchable (depending on the results of DECISION 360) and organizable based on the application, the setting (e.g., page size, font, theme, style, start page, notification policies, save policies, contact preferences, language), the time of last editing the setting, etc., and may be grouped alphabetically, thematically (e.g., all font settings are placed together), chronologically (e.g., least recently modified first, most recently modified first), based on frequency (e.g., settings modified most often, settings appearing in the most applications), etc. A user may browse the dialog and make changes, which will be transmitted by the suite API 116 to the web APIs 136 of affected web applications 132 so that the change will propagate from the one dialog to affect multiple applications. Various examples of the dialog are shown in FIGS. 2A-G.

In OPERATION 380, a fallback dialog is provided to the user. This may be done temporarily while the data to build the full dialog are retrieved and processed, so as to reduce user frustration while the full dialog is rendered or to illustrate what settings are exposed, but may be unavailable due to connectivity issues or group policies that forbid the modification of those settings. For example, when no current settings for the user are known, the settings shown in the example dialogs of FIGS. 2A-G (or other dialogs) may be shown with no value (e.g., just a category for the setting is shown or available options are shown without a highlight around a currently chosen option). In another example, when the settings known for the user are known from the client cache 114, but not from the application cache 134, the settings shown in the example dialogs of FIGS. 2A-G (or other dialogs) may be locked or grayed out so that the user cannot modify them or additional information will be shown to the user to indicate that changes made will only affect the local client 112 and will not be distributed out to the web-based programs or storage solutions.

When a change is made in the dialog to a setting, it may be committed immediately in the local client 112 via the client cache 114 as it is propagated to the remote application hosts 130 or the change may wait to take effect until confirmation from the application host 130 is received that the change has been committed to the application cache 134. Method 300 concludes after OPERATION 370 or OPERATION 380 when the user commits a change or closes the dialog.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
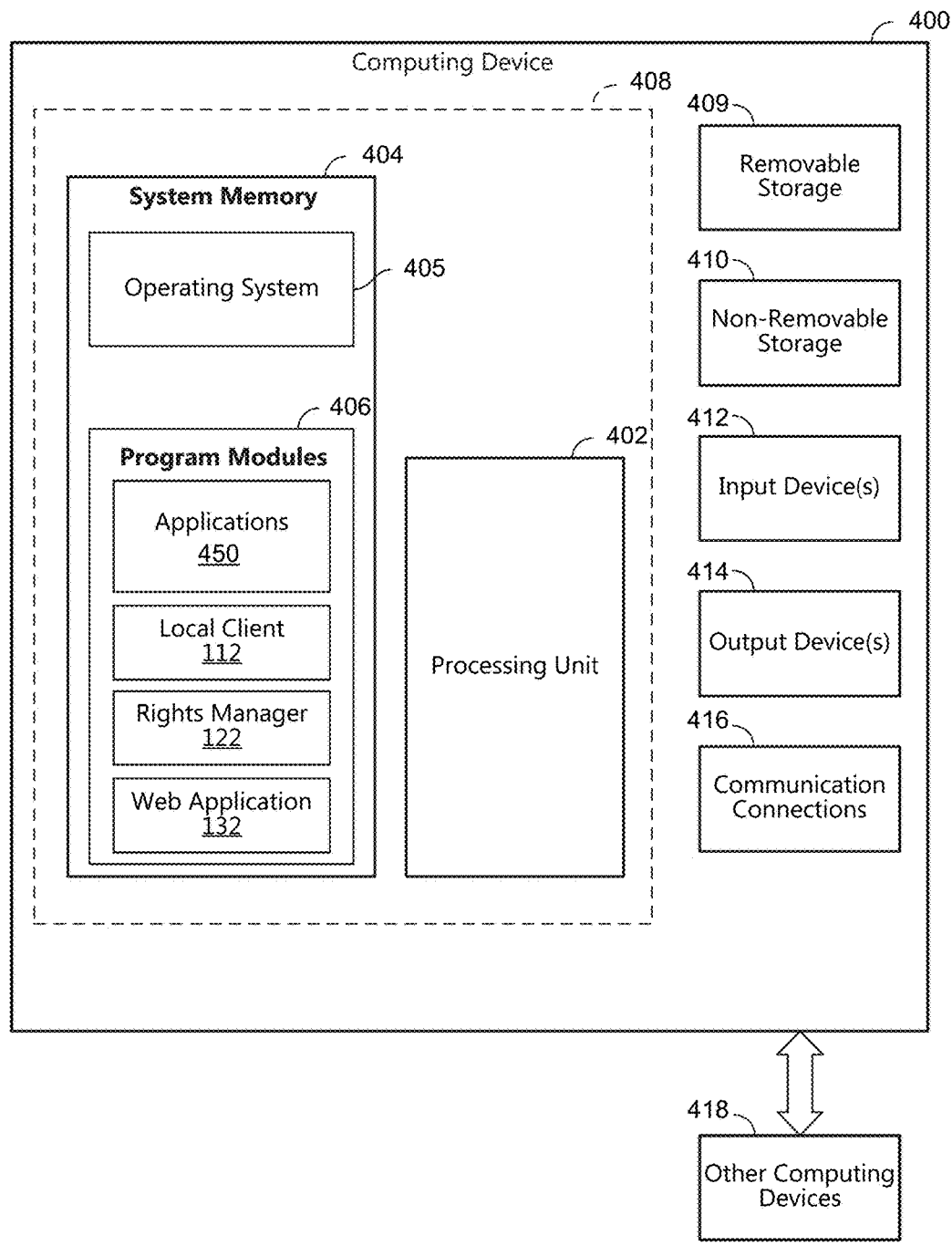
FIG. 4 is a block diagram illustrating physical components of a computing device with which examples may be practiced.
Figure 5A:
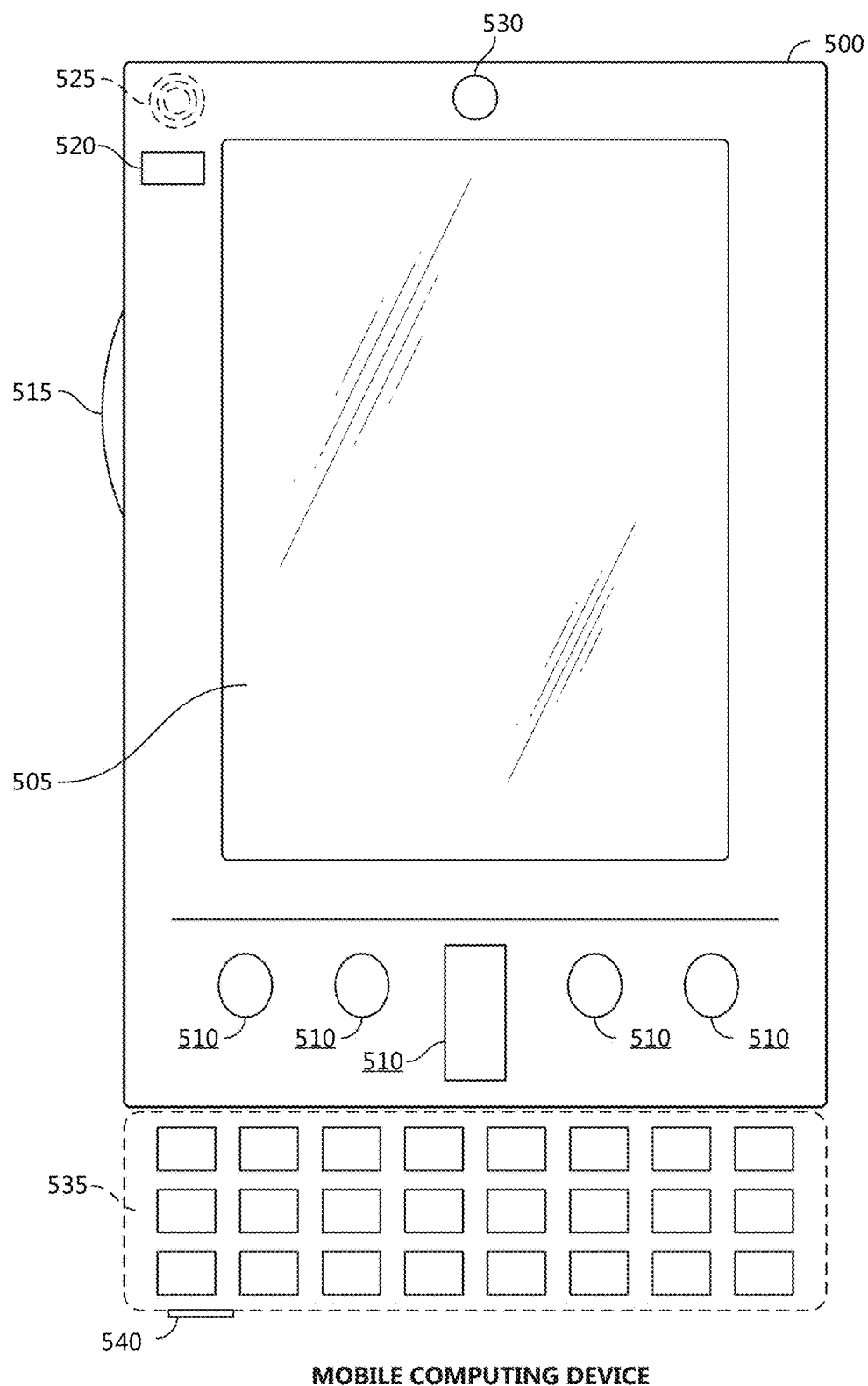
FIGS. 5A and 5B are block diagrams of a mobile computing device with which aspects may be practiced.
Figure 5B:
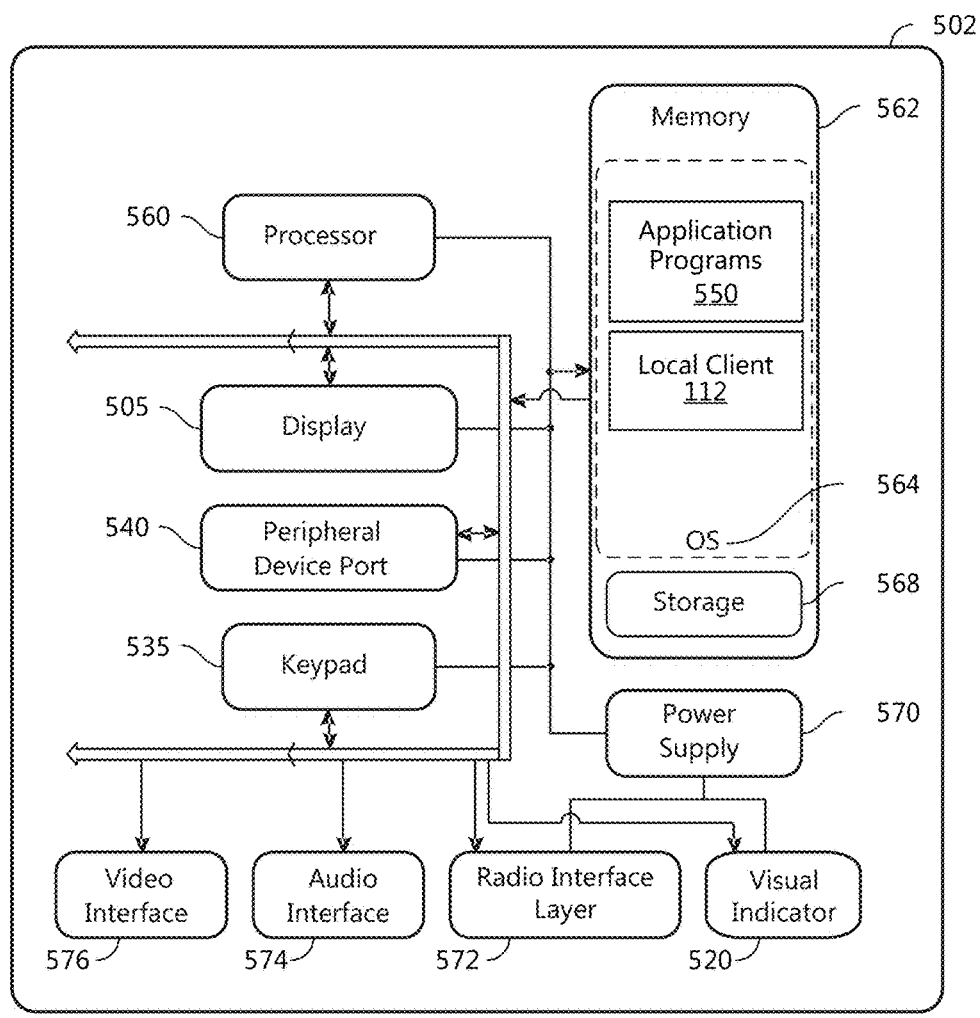
Figure 6:
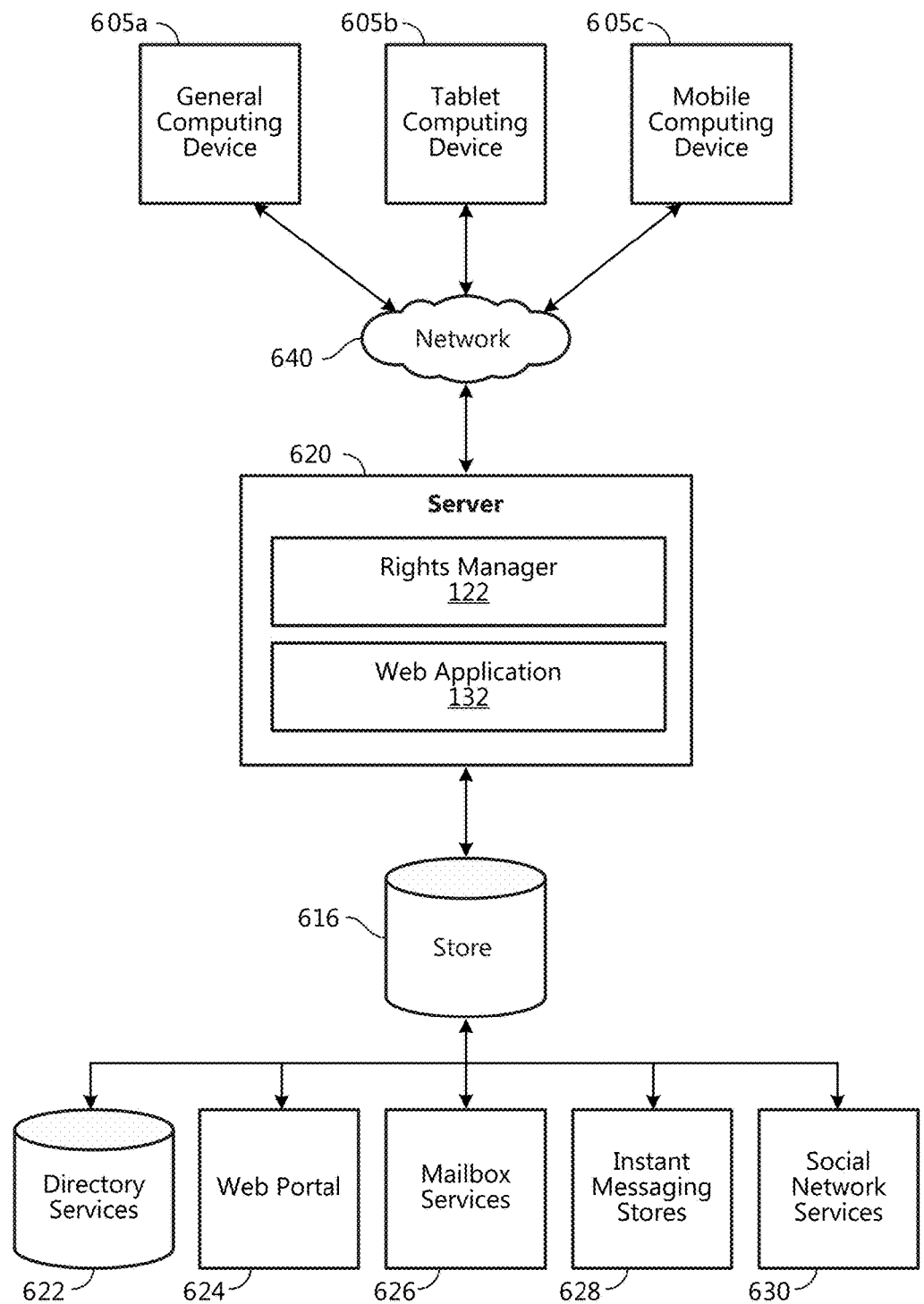
FIG. 6 is a block diagram of a distributed computing system in which aspects may be practiced.

FIGS. 4-6 and the associated descriptions provide a discussion of a variety of operating environments in which examples are practiced. However, the devices and systems illustrated and discussed with respect to FIGS. 4-6 are for purposes of example and illustration and are not limiting of a vast number of computing device configurations that are utilized for practicing aspects, described herein.

FIG. 4 is a block diagram illustrating physical components (i.e., hardware) of a computing device 400 with which examples of the present disclosure may be practiced. In a basic configuration, the computing device 400 includes at least one processing unit 402 and a system memory 404. According to an aspect, depending on the configuration and type of computing device, the system memory 404 comprises, but is not limited to, volatile storage (e.g., random access memory), non-volatile storage (e.g., read-only memory), flash memory, or any combination of such memories. According to an aspect, the system memory 404 includes an operating system 405 and one or more program modules 406 suitable for running software applications 450. According to an aspect, the system memory 404 includes a local client 112, web application 132, and/or rights manager 122, operable to enable a software application 450 to employ the teachings of the present disclosure via stored instructions. The operating system 405, for example, is suitable for controlling the operation of the computing device 400. Furthermore, aspects are practiced in conjunction with a graphics library, other operating systems, or any other application program, and is not limited to any particular application or system. This basic configuration is illustrated in FIG. 4 by those components within a dashed line 408. According to an aspect, the computing device 400 has additional features or functionality. For example, according to an aspect, the computing device 400 includes additional data storage devices (removable and/or non-removable) such as, for example, magnetic disks, optical disks, or tape. Such additional storage is illustrated in FIG. 4 by a removable storage device 409 and a non-removable storage device 410.

As stated above, according to an aspect, a number of program modules and data files are stored in the system memory 404. While executing on the processing unit 402, the program modules 406 (e.g., local client 112, web application 132, and/or rights manager 122) perform processes including, but not limited to, one or more of the stages of the method 300 illustrated in FIG. 3. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 400 has one or more input device(s) 412 such as a keyboard, a mouse, a pen, a sound input device, a touch input device, etc. The output device(s) 414 such as a display, speakers, a printer, etc. are also included according to an aspect. The aforementioned devices are examples and others may be used. According to an aspect, the computing device 400 includes one or more communication connections 416 allowing communications with other computing devices 418. Examples of suitable communication connections 416 include, but are not limited to, radio frequency (RF) transmitter, receiver, and/or transceiver circuitry; universal serial bus (USB), parallel, and/or serial ports.

The term computer readable media, as used herein, includes computer storage media apparatuses and articles of manufacture. Computer storage media include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage). According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. According to an aspect, any such computer storage media is part of the computing device 400. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a tablet personal computer, a laptop computer, and the like, with which aspects may be practiced. With reference to FIG. 5A, an example of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. According to an aspect, the display 505 of the mobile computing device 500 functions as an input device (e.g., a touch screen display). If included, an optional side input element 515 allows further user input. According to an aspect, the side input element 515 is a rotary switch, a button, or any other type of manual input element. In alternative examples, mobile computing device 500 incorporates more or fewer input elements. For example, the display 505 may not be a touch screen in some examples. In alternative examples, the mobile computing device 500 is a portable phone system, such as a cellular phone. According to an aspect, the mobile computing device 500 includes an optional keypad 535. According to an aspect, the optional keypad 535 is a physical keypad. According to another aspect, the optional keypad 535 is a "soft" keypad generated on the touch screen display. In various aspects, the output elements include the display 505 for showing a graphical user interface (GUI), a visual indicator 520 (e.g., a light emitting diode), and/or an audio transducer 525 (e.g., a speaker). In some examples, the mobile computing device 500 incorporates a vibration transducer for providing the user with tactile feedback. In yet another example, the mobile computing device 500 incorporates a peripheral device port 540, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one example of a mobile computing device. That is, the mobile computing device 500 incorporates a system (i.e., an architecture) 502 to implement some examples. In one example, the system 502 is implemented as a "smart phone" capable of running one or more applications (e.g., browser, e-mail, calendaring, contact managers, messaging clients, games, and media clients/players). In some examples, the system 502 is integrated as a computing device, such as an integrated personal digital assistant (PDA) and wireless phone.

According to an aspect, one or more application programs 550 are loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. According to an aspect, local client 112 is loaded into memory 562. The system 502 also includes a non-volatile storage area 568 within the memory 562. The non-volatile storage area 568 is used to store persistent information that should not be lost if the system 502 is powered down. The application programs 550 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

According to an aspect, the system 502 has a power supply 570, which is implemented as one or more batteries. According to an aspect, the power supply 570 further includes an external power source, such as an AC adapter or a powered docking cradle that supplements or recharges the batteries.

According to an aspect, the system 502 includes a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 550 via the operating system 564, and vice versa.

According to an aspect, the visual indicator 520 is used to provide visual notifications and/or an audio interface 574 is used for producing audible notifications via the audio transducer 525. In the illustrated example, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. According to an aspect, the system 502 further includes a video interface 576 that enables an operation of an on-board camera 530 to record still images, video stream, and the like.

According to an aspect, a mobile computing device 500 implementing the system 502 has additional features or functionality. For example, the mobile computing device 500 includes additional data storage devices (removable and/or non-removable) such as, magnetic disks, optical disks, or tape. Such additional storage is illustrated in FIG. 5B by the non-volatile storage area 568.

According to an aspect, data/information generated or captured by the mobile computing device 500 and stored via the system 502 are stored locally on the mobile computing device 500, as described above. According to another aspect, the data are stored on any number of storage media that are accessible by the device via the radio 572 or via a wired connection between the mobile computing device 500 and a separate computing device associated with the mobile computing device 500, for example, a server computer in a distributed computing network, such as the Internet. As should be appreciated, such data/information are accessible via the mobile computing device 500 via the radio 572 or via a distributed computing network. Similarly, according to an aspect, such data/information are readily transferred between computing devices for storage and use according to well-known data/information transfer and storage means, including electronic mail and collaborative data/information sharing systems.

FIG. 6 illustrates one example of the architecture of a system for automatic presentation of blocks of repeated content as described above. Content developed, interacted with, or edited in association with the web application 132, and/or rights manager 122 is enabled to be stored in different communication channels or other storage types. For example, various documents may be stored using a directory service 622, a web portal 624, a mailbox service 626, an instant messaging store 628, or a social networking site 630. The web application 132, and/or rights manager 122 is operative to use any of these types of systems or the like for distribution of selected content, as described herein. According to an aspect, a server 620 provides the web application 132, and/or rights manager 122 to clients 605a-c (generally clients 605), which may be run client machines 110. As one example, the server 620 is a web server providing web application 132, and/or rights manager 122 over the web. The server 620 provides web application 132, and/or rights manager 122 over the web to clients 605 through a network 640. By way of example, the client computing device is implemented and embodied in a personal computer 605a, a tablet computing device 605b or a mobile computing device 605c (e.g., a smart phone), or other computing device. Any of these examples of the client computing device are operable to obtain content from the store 616.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the present disclosure.

We claim:

1. A method for sharing user settings across multiple applications from a dialog provided in a single application, comprising:
    downloading application data on a client machine in response to a command from a user;
    determining whether exposed settings are included in the application data;
    when it is determined that the application data include the exposed settings, determining whether current settings for the user are included in the application data;
    when it is determined that the application data include the current settings for the user, determining whether the application data are retrieved from a client cache on the client machine or from an application cache on a remote application host;
    when it is determined that the application data were retrieved from the client cache, providing a fallback dialog;
    when it is determined that the application data are retrieved from the application cache, determining whether search metadata were included in the application data;
    when it is determined that the application data included the search metadata, providing the dialog with search features enabled for the user settings; and
    when it is determined that the application data did not include the search metadata, providing the dialog with the search features disabled for the user settings.

2. The method of claim 1, wherein the fallback dialog displays the user settings that are exposed in a read-only mode.

3. The method of claim 1, wherein the application data that are downloaded are governed by a rights manager based on licenses associated with the user held by a rights server in a license cache, wherein the licenses indicate applications hosted by the remote application host that the user has rights to access.

4. The method of claim 1, wherein the dialog is operable to affect the exposed settings of the multiple applications while at least some of the multiple applications are in an inactive state.

5. The method of claim 1, further comprising:
    receiving search criteria via the search features when the search features are enabled;
    comparing the search criteria against the search metadata to determine matching settings from the exposed settings; and
    providing, via the dialog, the matching settings.

6. The method of claim 1, wherein the dialog is provided as an editable dialog that in response to receiving an update to the user settings transmits the update to the application cache and the client cache.

7. A system for sharing user settings across multiple web applications of a productivity suite from a dialog provided in a single web application of the productivity suite, comprising:
    an application host, comprising a hardware processor and a computer storage medium storing instructions, the application host in communication with a first client machine, wherein, when the hardware processor executes the stored instructions, the application host is caused to:
    provide a plurality of web applications of a productivity suite to the first client machine;
    receive a user command request, via one of the plurality of web applications, to change a user setting related to one or more of the plurality of web applications;
    identify an exposed setting for the plurality of web applications of the productivity suite;
    provide the dialog within the one of the plurality web of applications populated with the exposed setting, wherein the dialog is provided on the first client machine;
    receive an update to the exposed setting via the dialog, the update affecting at least two different web applications of the productivity suite;
    update a first local cache associated with the productivity suite on the first client machine according to the update; and
    update an application cache associated with the productivity suite on the application host according to the update.

8. The system of claim 7, wherein the application host is in communication with a second client machine associated with the first client machine, and the application host is further operable to:
    update a second local cache on the second client machine according to the update.

9. The system of claim 7, wherein the first local cache applies the updated exposed setting to a local application.

10. The system of claim 7, where at least one of the at least two different of web applications receives the update to the exposed setting while in an inactive state.

11. The system of claim 7, wherein the application host is in communication with a rights server and is further caused to:
    query the rights server for a license associated with a user of the first client machine to determine which of the plurality of web application are unlicensed web applications for the first client machine; and
    when it is determine that one of the plurality of web applications is unlicensed, provide an alert in the dialog.

12. A method for sharing user settings across multiple web applications of a productivity suite from a dialog provided in a single web application of the productivity suite, comprising:
    providing a plurality of web applications of a productivity suite to a first client machine;
    receiving a user command request at the first client machine, via one of the plurality of web applications, to change a user setting related to one or more of the plurality of web applications;
    identifying an exposed setting for the plurality of web applications of the productivity suite;
    providing a dialog, on the first client machine, within the one of the plurality web of applications populated with the exposed setting;
    receiving an update to the exposed setting via the dialog, the update affecting at least two different web applications of the productivity suite;

updating a first local cache associated with the productivity suite on the first client machine according to the update; and updating an application cache associated with the productivity suite on an application host according to the update.

13. The method of claim 12, wherein the first client machine is in communication with a second client machine, and wherein the method further comprises updating a second local cache of the second client machine according to the update.

14. The method of claim 12, further comprising applying the updated exposed setting in the first local cache to a local application.

15. The method of claim 12, further comprising, one of the at least two different web applications receiving the update to the exposed setting while in an inactive state.

16. The method of claim 12, further comprising:
querying a rights server for a license associated with a user of the first client machine to determine which of the plurality of web application are unlicensed web applications for the first client machine; and when it is determined that one of the plurality of web applications is unlicensed, providing an alert regarding the unlicensed web application in the dialog.

17. A method for modifying user settings across web-based applications, the method comprising:
determining a plurality of web-based applications that are both available to a user and have one or more user-modifiable settings, wherein the plurality of web-based applications are non-browser applications;

aggregating the plurality of web-based applications determined to be available to the user and to have the one or more user-modifiable settings;

aggregating the one or more user-modifiable settings for each of the respective web-based applications of the aggregated plurality of web-based applications;

displaying a single web-based user-interface on a display of a computing device, wherein the single web-based user-interface includes a listing of the aggregated plurality of web-based applications;

receiving a selection of at least one of the listed plurality of web-based applications; and based on the received selection, displaying within the same single web-based user-interface, the aggregated one or more user-modifiable settings of the respective selected web-based application.

18. The method of claim 17, wherein the listing of the aggregated plurality of web-based applications remains displayed when the aggregated one or more user-modifiable settings of the respective selected web-based application are displayed within the single web-based user interface.

19. The method of claim 17, wherein the one or more user-modifiable settings comprise remotely-stored one or more user-modifiable settings.

20. A system for modifying user-settings across web-based applications, the system comprising:
a display device;
a processor in communication with the display device;
a memory device storing executable instructions that when executed by the processor cause the processor to:
determine a plurality of web-based applications that are both available to a user and have one or more user-modifiable settings, wherein the plurality of web-based applications are non-browser applications;

aggregate the plurality of web-based applications determined to be available to the user and to have the one or more user-modifiable settings;

aggregate the one or more user-modifiable settings for each of the respective web-based applications of the aggregated plurality of web-based applications;

display a single web-based user-interface on the display, wherein the single web-based user-interface includes a listing of the aggregated plurality of web-based applications;

receive a selection of at least one of the listed plurality of web-based applications; and based on the received selection, display within the same single web-based user-interface, the aggregated one or more user-modifiable settings of the respective selected web-based application.

* * * * *